(No Model.)
T. L. ARMSTRONG.
DRILLING APPARATUS.
No. 589,110.  Patented Aug. 31, 1897.
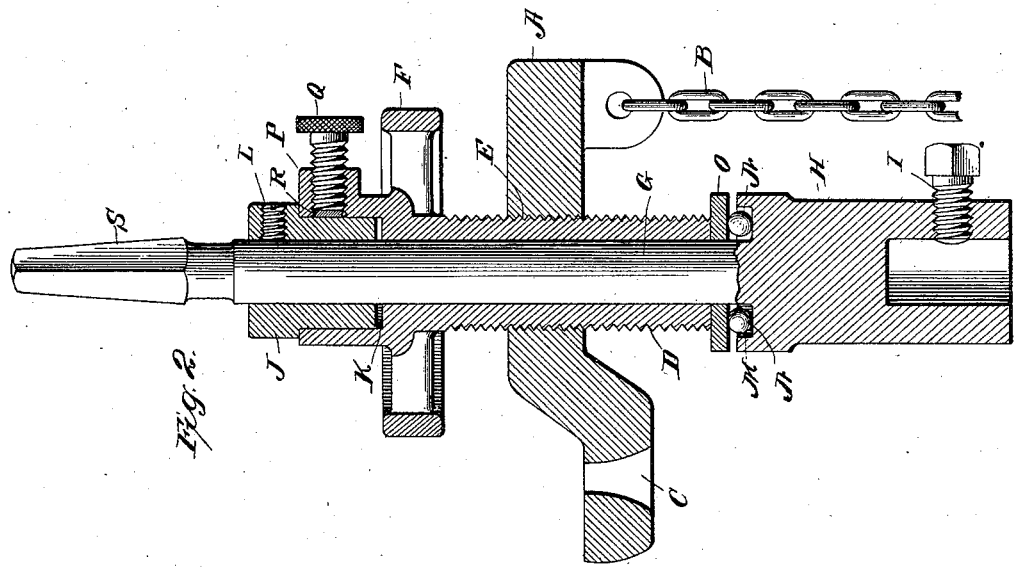
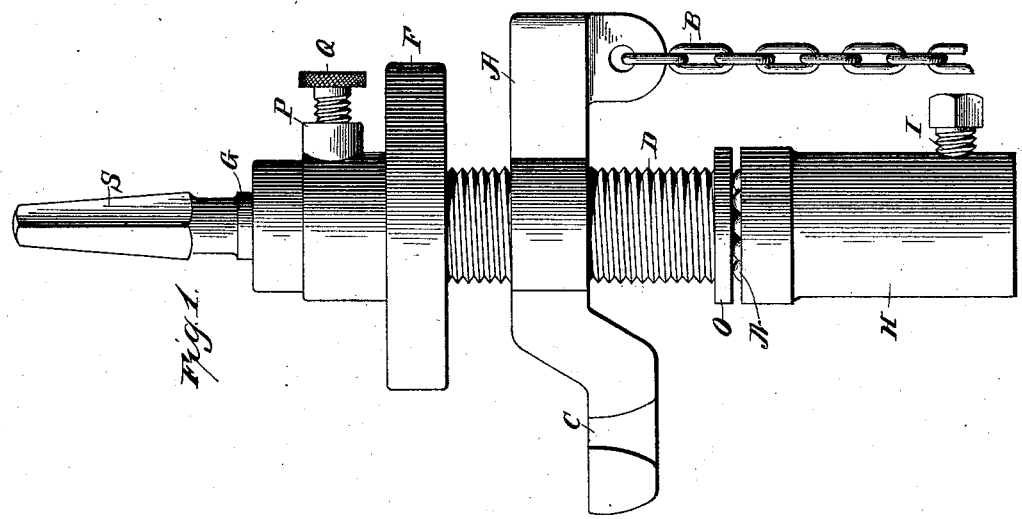
Witnesses
E. C. Wurdman
S. Williamson
Inventor
Thomas L. Armstrong
By Geo. H. Holgate
Attorney

UNITED STATES PATENT OFFICE.

THOMAS L. ARMSTRONG, OF PHILADELPHIA, PENNSYLVANIA.

DRILLING APPARATUS.

SPECIFICATION forming part of Letters Patent No. 589,110, dated August 31, 1897.

Application filed April 6, 1897. Serial No. 630,930. (No model.)

*To all whom it may concern:*

Be it known that I, THOMAS L. ARMSTRONG, a citizen of the United States, residing at Philadelphia, in the county of Philadelphia and State of Pennsylvania, have invented a certain new and useful Improvement in Drilling Apparatus, of which the following is a specification.

My invention relates to a new and useful improvement in drilling apparatus, and has for its principal object to simplify and render more efficient the construction shown in United States Patent No. 555,442, granted February 29, 1896, to W. L. Fifield, and, further, to render the manipulation of such a device more simple and to increase its durability.

In the construction shown in the above-referred-to patent the threaded spindle passes through a bushing, which latter is threaded in the yoke, and means are provided for forcing a shoe against the outer surface of this bushing; but many disadvantages are incident to this construction, among which is the fact that the surface of the bushing being large relative to the surface of the threaded spindle within the bushing there is a greater tendency to retard the rotation of the bushing than there is a tendency to revolve the same by the friction therebetween and the threaded spindle, and another disadvantage of this construction is that the spindle itself being threaded has a tendency to wabble when being rotated, thus throwing the action of the drill out of true. These disadvantages are overcome by my improvement.

In order that those skilled in the art to which this invention appertains may understand how to make and use the same, the construction and operation will now be described in detail, referring to the accompanying drawings, forming a part of this specification, in which—

Figure 1 is an elevation of my improvement; and Fig. 2, a central vertical section thereof, the spindle being left in elevation.

In carrying out my invention as here embodied, A represents the bracket-yoke, to which is attached the chain B, and this yoke and chain are of the usual construction, the object being to secure the device around the object to be drilled, the opposite end of the chain being attached to the yoke at the point C, as will be readily understood.

A feed-screw D is threaded through the yoke, as indicated at E, and with the upper portion of this screw is formed a hand-wheel F, by means of which it may be revolved when occasion requires, and through the center of this screw, which is made hollow for that purpose, is passed the spindle G, which is smooth and therefore adapted to turn within the screw independent of the latter, as will be hereinafter set forth. The lower end of the spindle has formed therewith the socket H, adapted to receive the drill or other boring-tool, and a set-screw I, threaded through said socket, is for the purpose of holding said drill in place.

The spindle G is prevented from being withdrawn from the screw by the collar J, the lower portion of which is reduced so as to fit within the socket K, formed in the upper end of the screw, and this collar is held upon the spindle by the set-screw L, so that in manipulating these parts of the device it is only necessary to pass the spindle through the screw, place the collar thereon, and tighten the set-screw L, when these parts will be retained in their proper relative positions.

In order that as little friction as possible may be generated between the spindle and the screw, I have here shown the head of the socket as having an annular recess M formed therein, in which are fitted the balls N, a washer O being placed thereabove against the lower end of the screw for holding said balls in place, and, as is obvious, this will form a ball-bearing between the head of the socket and the screw, which will receive the thrust of this head against the end of the screw, and thus greatly reduce the friction therebetween and permit a further revolving of the spindle. It is also to be noted that when the spindle is revolved the collar J is also revolved therewith, and this fact I utilize to bring about the proper amount of retarding action to accomplish the results aimed at—namely, the automatic feeding of the spindle when in operation. An offset boss P is formed upon the head of the screw D, and through this boss is threaded a thumb-screw Q, the inner end bearing against the washer R, which latter in turn bears against the outer surface of the collar J.

From the foregoing description the operation of my improvement will be obviously as follows: After the device has been placed in position upon the object to be bored and the proper manipulating mechanism secured upon the shank S of the spindle the revolving of the spindle will cause the drill or boring-tool to cut away the metal against which it is placed, and likewise the revolving of the spindle and the collar J therewith will create a certain amount of friction upon the washer R, and this will give the screw D a tendency to revolve in the direction, but so long as the drill is resisted by the metal acted upon to the extent of exerting a thrust upon the screw sufficient to or greater than the friction between the spindle and the washer R it follows that the screw will not be revolved, or when the drill by its cutting action has partially relieved this thrust, so that the friction upon the washer R gives a greater tendency to the screw to revolve than this thrust exerts to prevent its revolving, this screw will revolve and in so doing be fed downward through the yoke, thereby feeding downward the spindle and drill carried thereby, and this operation will continue so long as the friction upon the washer R is sufficient to overcome the thrust upon the end of the screw, but the moment this thrust equals or overbalances the tendency of said friction the downward feeding of the drill will be arrested and said drill permitted to revolve without feed until its cutting action has again partly relieved the thrust. Thus it will be seen that without any care upon the part of the operator the drill will automatically feed itself. It follows that various kinds of work require various strengths of feed, and this is provided for by the thumb-screw Q, since when it is found that greater friction is needed upon the collar J to bring about the feeding of the spindle this increased friction may be had by simply turning the thumb-screw in the proper direction, as will be readily understood.

The fact that the spindle has a long smooth bearing within the screw renders it more steady and even of action and therefore permits the accomplishment of a better quality of work than would otherwise be the case.

The hand-wheel F is utilized for the adjustment of the spindle for the initial starting of the work, and is also utilized for backing the drill off the work when the latter has been accomplished or for other purposes. It is also to be noted that no spring is utilized in this construction, and this fact is of considerable advantage, since in the construction referred to in the above-named patent utilizing such a spring is easily disarranged at this point. It has also been found in practice that the ball-bearing increases the amount of work which may be accomplished with a given power, and this is especially advantageous in the manipulation of large drills or boring-tools.

Having thus fully described my invention, what I claim as new and useful is—

1. A drilling apparatus consisting of a yoke, a hollow screw threaded therethrough, a spindle fitted to revolve within said screw, a drill-socket carried upon one end of the spindle, a wrench-shank formed upon the opposite end of said spindle, a collar fitted upon the spindle and extending within the screw, and a thumb-screw passed through the head of the first-named screw for creating a friction upon the collar, as specified.

2. In combination, a bracket-yoke, a hollow screw threaded therethrough, a smooth spindle fitted to revolve within said screw, a drill-socket carried by one end of the spindle, a ball-bearing interposed between said socket and screw, a hand-wheel formed upon the screw, a collar formed upon the spindle and extending within the socket in the screw, a thumb-screw threaded in the boss formed upon the first-named screw, and a washer interposed between the end of the thumb-screw and the collar, substantially as and for the purpose set forth.

3. A drilling apparatus consisting of a yoke, a hollow screw threaded therethrough, a spindle provided with a drill-socket at one end, said spindle being fitted to revolve within the hollow screw a thumb-nut run through the upper end of the screw, a collar on the spindle projecting within the hollow screw and adapted to be engaged by said thumb-nut, and a ball-bearing interposed between the drill-socket and the hollow screw, substantially as described.

In testimony whereof I have hereunto affixed my signature in the presence of two subscribing witnesses.

THOMAS L. ARMSTRONG.

Witnesses:
S. S. WILLIAMSON,
SAMUEL L. TAYLOR.